United States Patent [19]
Jungquist

[11] Patent Number: 4,886,363
[45] Date of Patent: Dec. 12, 1989

[54] QUADRATIC FREQUENCY MODULATED ABSOLUTE DISTANCE MEASURING INTERFEROMETRY

[75] Inventor: Robert K. Jungquist, Rochester, N.Y.

[73] Assignee: Eastman Kodak Company, Rochester, N.Y.

[21] Appl. No.: 240,651

[22] Filed: Sep. 6, 1988

[51] Int. Cl.$^4$ .............................................. G01B 9/02
[52] U.S. Cl. .................................... 356/349; 356/358
[58] Field of Search ................................ 356/349, 358

[56] References Cited

U.S. PATENT DOCUMENTS

| 3,767,307 | 10/1973 | Bowker. | |
|---|---|---|---|
| 4,019,818 | 4/1977 | Vilkomerson. | |
| 4,165,182 | 8/1979 | Vilkomerson. | |
| 4,295,741 | 10/1981 | Palma et al.. | |
| 4,594,003 | 6/1986 | Sommargren | 356/349 |
| 4,611,915 | 9/1986 | Gillard et al.. | |
| 4,632,554 | 12/1986 | Pearce. | |
| 4,714,346 | 12/1987 | Eichen et al. | 356/349 |
| 4,749,277 | 6/1988 | Eichen et al. | 356/349 |
| 4,759,628 | 7/1988 | Tatsuno et al. | 356/349 |

OTHER PUBLICATIONS

Kubota et al., "Interferometer for Measuring Displacement & Distance", Optics Letters, vol. 12, No. 5, (1987), 310-12, p. 2, line 5.

Kikuta et al., "Distance Measurement by the Wavelength Shift of Laser Diode Light", Applied Optics, vol. 25, No. 17, (1986), 2976-80.

Tatsuno et al., "Diode Laser Direct Modulation Heterodyne Interferometer", Applied Optics, vol. 26, No. 1, (1987), 37-9.

A. J. denBoef, "Interferometric Laser Rangefinder Using A Frequency Modulated Diode Laser", Applied Optics, vol. 26, No. 21, (1987)—4545-50.

Primary Examiner—Davis L. Willis
Assistant Examiner—Matthew W. Koren
Attorney, Agent, or Firm—Thomas H. Close

[57] ABSTRACT

In a frequency modulated absolute distance measurement interferometer, distance to a test object is determined by quadratically modulating the frequency of a laser beam, and detecting the rate of change of a beat frequency produced at the output of the interferometer, thereby enabling the measurement to a moving test object.

6 Claims, 4 Drawing Sheets

QUADRATIC FREQUENCY MODULATED ABSOLUTE DISTANCE MEASURING INTERFEROMETRY

FIELD OF THE INVENTION

This invention relates to absolute distance measuring interferometry, and more particularly to interferometry employing frequency modulation to resolve the range ambiguity in conventional interferometry.

BACKGROUND OF THE INVENTION

Conventional interferometry measures the relative optical path difference between two arms (paths) in an interferometer. For example, in a Twyman-Green style interferometer having a reference arm where a beam of light is reflected from a reference object and a test arm where a beam of light is reflected from a test object an interferogram is formed by combining the two beams. The interferometer measures the optical path difference between the length of the test arm and the length of the reference arm by moving the test object and detecting the motion of the interference fringes produced thereby. The measurement measures the optical path difference as some multiple of the wavelength of light employed in the interferometer. The ambiguity in the range is removed by a priori knowledge of the actual distance of the test object to within a wavelength.

In absolute distance measuring interferometry, it is not necessary to know the absolute distance to the test object to within a wavelength of the light in the interferometer. The length of the test arm is measured by employing a plurality of frequencies of light. For example, the measurement may be accomplished by using a linear sweep or chripped frequency modulation of the light source. This produces a beat frequency on the output of the interferometer proportional to the distance to the test object and the modulation frequency. For example, see T. Kubota, et al., Optics Letters 12 (1987) 310-12. The problem with such absolute distance measurement interferometry employing linear frequency modulation is that to obtain accurate distance measurements, the test object must be at rest during the measurement. If the test object moves during the measurement, a Doppler frequency shift is produced in the interferometer resulting in an erroneous distance interpretation of the frequency at the output of the interferometer.

It is therefore an object of the invention to provide a method and apparatus for absolute distance measuring interferometry that is capable of measuring the distance to a moving test object.

SUMMARY OF THE INVENTION

The object is achieved according to the present invention by employing quadratic frequency modulation of a laser source (typically a diode laser). The output of the temporal interference pattern allows the Doppler frequency to be monitored as well as the absolute distance at the beginning of a pulse to be extracted. The absolute distance measurement is accomplished by computing the rate of change of the beat frequency of the output of the interferometer and multiplying by a constant for the particular modulation device and modulation frequency. For a diode laser, this constant is proportional to the peak current as well as the diode frequency to current parameter ($\Delta f/\Delta i$).

MODES OF PRACTICING THE INVENTION

Figure 1:
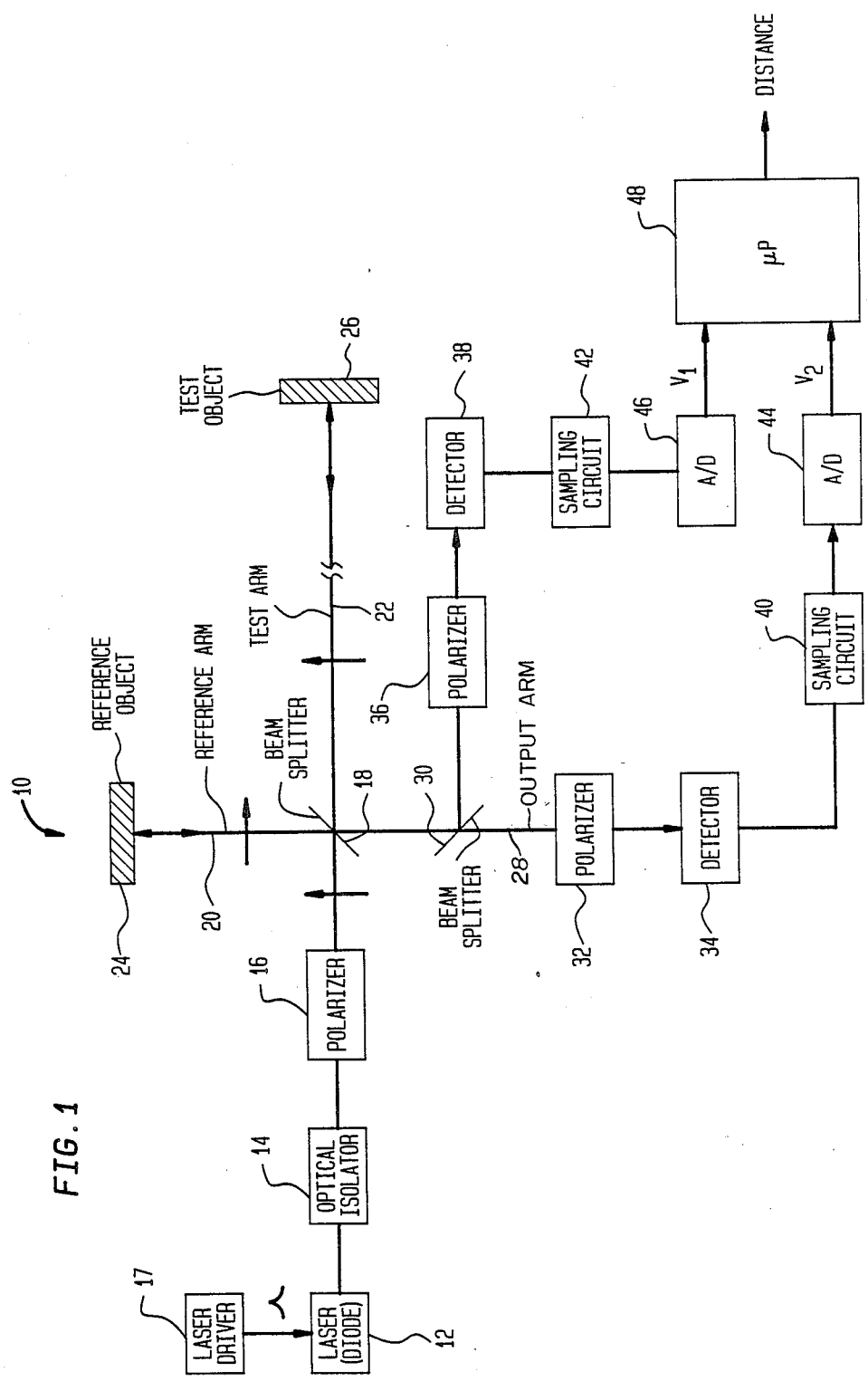
FIG. 1 depicts a Twyman-Green interferometer modified to perform absolute distance measurement interferometry according to the present invention.

FIG. 1 shows a Twyman-Green interferometer 10 modified for performing absolute distance measurement interferometry according to the present invention. The interferometer 10 includes a diode laser source 12 that projects a beam of coherent light through an optical isolator 14 and polarizer 16. The frequency of the beam is quadratically modulated by driving the laser with a driver 17 that produces an injection current to the laser diode that varies in a parabolic fashion. The beam is split by a beam splitter 18 into a reference arm 20 and test arm 22. The beam in the reference arm 20 is reflected from a reference object 24 that is a fixed part of the absolute measurement apparatus. The beam in the test arm 22 is reflected from a test object 26 at an unknown distance from the measurement apparatus 10. The reflected beams in the reference and test arms are recombined by beam splitter 18 in an output arm 28 where an interference pattern is produced. The recombined beam is split by a second beam splitter 30. Beam splitter 30 is a phase retarding beam splitter that produces circularly polarized beams in the output arm 28. One part of the beam in the output arm 28 is analyzed by a polarizer 32 and detected by a detector 34. The other part of the beam in the output arm 28 is analyzed by polarizer 36 arranged at 90° to the polarizer 32 and detected by a detector 38.

For constant position of the test object, the interference pattern produced in the output arm by interference of the light from both arms is constant, and modulo $2\pi$ phase information can be extracted from the fringe pattern. Absolute distance in the test arm can be obtained by modulating the phase of the laser light. With diode lasers it is possible to modulate the frequency (wavelength) and, hence, modulate the phase directly by modulating the injection current.

Figure 2:
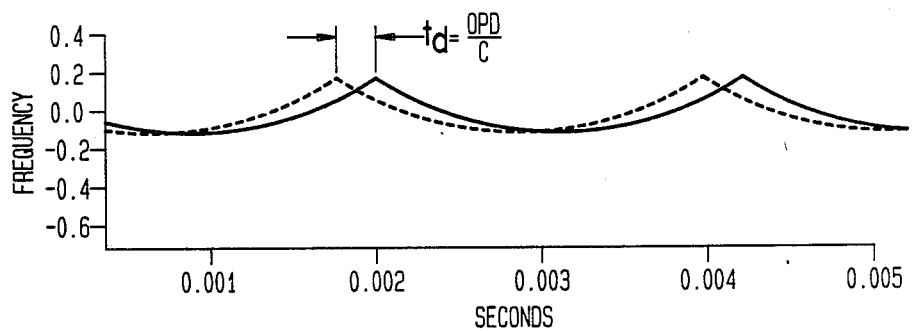
FIG. 2 is a plot showing the relationships between the instantaneous frequency with time in the two arms of the interferometer.
Figure 3:
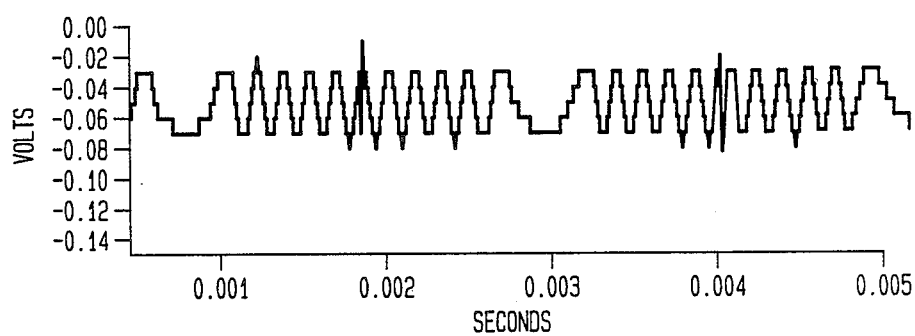
FIG. 3 is a plot showing the instantaneous beat frequency produced by the detectors in FIG. 1.

When the frequency source 12 is modulated, the interference pattern in the output arm 28 is modulated in time. FIG. 2 shows the time dependence of the frequency (plotted in arbitrary units) in the test arm and the reference arm for quadratic frequency modulation. The solid line in FIG. 2 depicts the frequency modulation in the reference arm while the dashed line depicts the frequency modulation in the test arm. The frequency modulation in the test arm is delayed by an amount:

$$t_d = opd \div c, \tag{1}$$

where opd is the optical path difference and c is the speed of light. The separation between the two curves is indicative of the beat frequency observed at the detector output. FIG. 3 is a plot showing the output signal (in volts) of one of the detectors in the interferometer, where the changing frequency with time and periodicity of the reciprocal of the modulation frequency can be seen.

The rate of change of the beat frequency in the output signal contains the information relating to the absolute optical path difference and the modulation parameters of the laser frequency. Specifically, the rate of change of the beat frequency is given by:

$$\beta = 4opd\Delta i_m f_m^2 (\partial f/\partial i)/c, \qquad (2)$$

where opd is the optical path difference, $\Delta i_m$ is the peak to peak modulated current $f_m$ is the modulation frequency, and c is the speed of light while $(\partial f/\partial i)$ is a parameter of the diode laser relating the instantaneous frequency shift to the injection current. More generally, when a diode laser is not employed to produce the frequency shift in the laser light, $\beta = 4opd\Delta f f_m^2/c$ where $\Delta f$ must be related to the device parameters for modulation of the frequency of the laser beam.

Since the absolute optical path difference is extracted according to the present invention from knowledge of the rate of change of the beat frequency, it is essentially insensitive to a Doppler frequency induced by motion of the test object. A cross term is present and is cubic in nature which couples the velocity and the absolute distance. However, this cross-term can be filtered out as described below in reference to the demodulation of the signal.

The cubic term can be ignored. Accuracy of the absolute measurement can be increased by simply increasing the modulation frequency the laser beam. The relative error term can be written as:

$$\Delta(opd)/opd = v/(opd.f_m), \qquad (3)$$

where v is the velocity and $f_m$ the modulation frequency. If v is 1 meter per second and opd is 1 meter then f must be 1 megahertz to maintain an error of less than $10^{-6}$.

Figure 4:
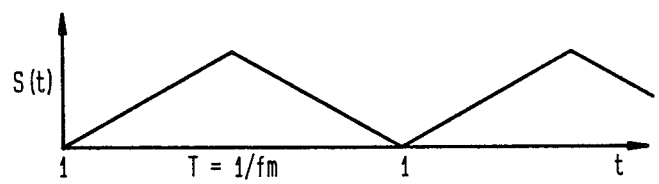
FIG. 4 shows the variation of beat frequency with time produced by the method of the present invention.

The signal is detected via ac coupled photodetectors 34 and 38 and is demodulated according to the following method. Since two signals are present in quadrature from detectors 34 and 38, the signal from channel 1 can be considered to be a cosine signal and is differentiated and divided by the signal from channel 2 which can be considered a sine signal. The result is a periodic signal S(t) shown in FIG. 4 with a triangular waveform. The slope of the triangular waveform contains the information about the rate of change of frequency and hence the absolute optical path difference or distance to the test object.

The demodulation of the signal to produce the absolute measurement is preferably performed by a programmed digital computer. As shown in FIG. 1, the signals from the detectors 34 and 38 are sampled by sampling circuits 40 and 42. The sampling circuits 40 and 42 contain amplifiers with automatic gain controls such that both signal's peak-to-peak voltage after amplification are equal and unity valued. The sampling circuits have an analog time constant less than that of the highest operating frequency. After being amplified, the signals are digitized simultaneously by analog to digital converters 44 and 46 respectively. The digitizing sampling period is fast enough to satisfy the Nyquist criterion for the highest frequency expected as well as slow enough to filter out the effects in the overlap region of the signal where no information is available. Thus, the sampling frequency satisfies the inequality:

$$4opd\Delta f f_m/c < f_s < c/opd. \qquad (4)$$

Employing the exemplary parameters opd=1 m, $f_m=1$ kHz, $\Delta f=2$ GHz, the sampling frequency $f_s$ falls in the range:

$$26 \text{ kHz} < f_s < 300 \text{ MHz}. \qquad (5)$$

Figure 5:
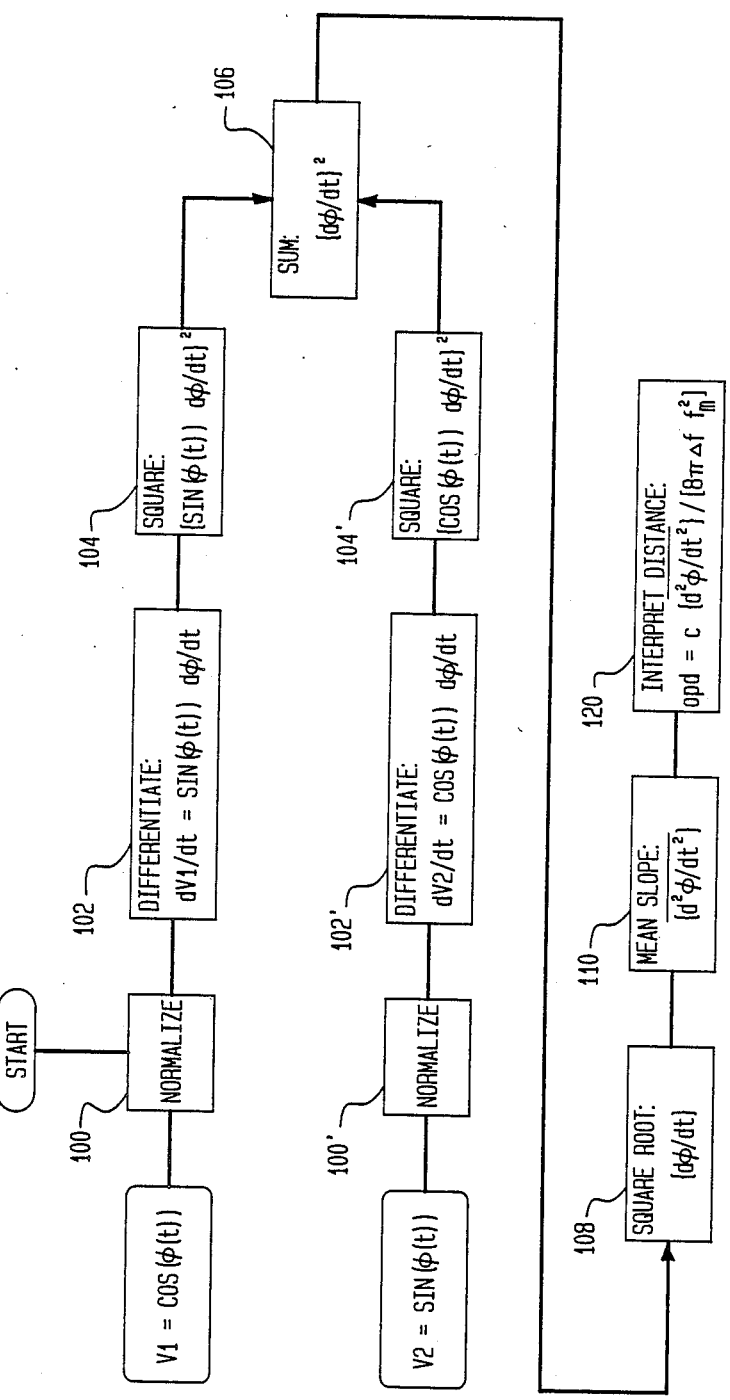
FIG. 5 is a block diagram showing the calculations for demodulating the signals according to the present invention.

The digitized signals $V_1$ and $V_2$ are supplied to the programmed microprocessor 48 to produce the distance measurement. The microprocessor 48 is programmed to perform the steps shown in FIG. 5. First, the signals $V_1$ and $V_2$ are normalized 100, 100' and then they are differentiated 102, 102'. After differentiation, both signals are squared 104, 104', and the squares are summed 106. The square root of the sum is taken 108, and the mean slope of the square root of the sum is computed 110.

Figure 6:
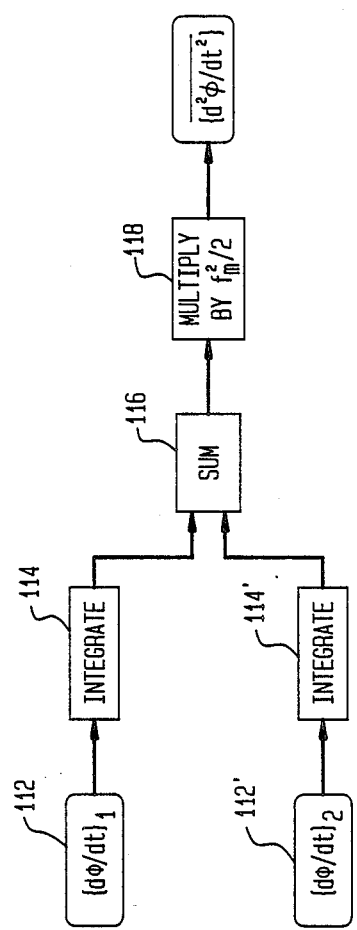
FIG. 6 is a block diagram showing the calculation of mean slope in FIG. 4.

Referring to FIG. 6, the method of computing the mean slope is shown in more detail. Two successive half modulation period phase derivatives are taken 112, 112'. Each of the phase derivatives are integrated over a half modulation period 114, 114', and the resultants are summed 116. The sum is multiplied by $f_m^2/2$ (118) to produce the slope of the derivative $\overline{\{d^2\phi/dt^2\}}$. This process has the effect of filtering all odd powered terms in the phase derivative.

Returning to FIG. 5, the optical path length (opd) is calculated 120 as:

$$opd = c\overline{\{d^2\phi/dt^2\}}/[8\pi\Delta f f_m^2], \qquad (6)$$

where c=speed of light; $\Delta f$=frequency shift; $f_m$=modulation frequency.

Industrial Applicability and Advantages

The present invention is useful in the field of absolute distance measurement interferometry and is advantageous over prior art frequency modulation distance measurement interferometry in that the measurement is insensitive to the motion of the test object, thereby enabling distance measurements to be made to moving objects.

I claim:

1. In an absolute distance measurement interferometry method of the type employing frequency modulation of a laser beam and detecting a beat frequency produced at the output of the interferometer to determine absolute distance to a test object, the improvement comprising the steps of:
    a. quadratically modulating the frequency of the laser beam; and
    b. detecting the rate of change of a beat frequency produced at the output of the interferometer to determine the absolute distance to the test object.

2. The method claimed in claim 1, wherein the laser beam is produced by a laser diode, and the step of quadratically modulating the laser beam comprises driving the laser diode with a parabolically variable driving current.

3. The method claimed in claim 1, wherein the beat frequency is detected by a first detector having an output representing a sine component of an interference pattern and a second detector having an output representing a cosine component of the interference pattern, the step of detecting the rate of change of the beat frequency comprises the steps of differentiating the output of the second detector and dividing the result by the output of the first detector to produce a triangular waveform, and detecting the slope of the triangular waveform as a measure of the rate of change of the beat frequency and hence the distance to the test object.

4. Absolute distance measurement apparatus comprising;
 a. means for producing a plane polarized laser beam having a quadratically variable frequency;
 b. interferometer means for splitting the laser beam into a reference beam and a test beam, the reference beam being reflected from a reference object fixed with respect to the apparatus and the test beam being reflected from a test object, the distance to which is being measured and for combining the reflected beams to form an interference pattern;
 c. detector means for detecting the interference pattern, including a first detector for detecting light polarized in a first direction and producing a first detection signal $V_1$ in response thereto, and a second detector for detecting light polarized in a second direction 90° to said first direction and producing a second detector signal $V_2$ in response thereto;
 d. computer means responsive to said first and second signals to form a distance detection signal represented by $D=(dV_1/dt)/V_2$ where D is a periodic signal having a triangular waveform, and wherein the slope of the triangular waveform represents the absolute distance to the test object, and including means for detecting the slope of the distance detection signal D to produce a signal representing the absolute distance to the test object.

5. The apparatus claimed in claim 1, wherein said means for producing a laser beam comprises a laser diode and drive means for parabolically modulating the injection current to the laser diode.

6. The apparatus claimed in claim 1, wherein said computer means comprises a programmed microprocessor.

* * * * *